(12) United States Patent
Nakagawa

(10) Patent No.: US 12,093,335 B2
(45) Date of Patent: Sep. 17, 2024

(54) SERVER, SYSTEM, AND DISPLAY DATA TRANSMISSION METHOD

(71) Applicant: NAKAGAWA CHEMICAL INC., Tokyo (JP)

(72) Inventor: Koichi Nakagawa, Tokyo (JP)

(73) Assignee: NAKAGAWA CHEMICAL INC., Tokyo (JP)

( * ) Notice: Subject to any disclaimer, the term of this patent is extended or adjusted under 35 U.S.C. 154(b) by 0 days.

(21) Appl. No.: 18/535,127

(22) Filed: Dec. 11, 2023

(65) Prior Publication Data
US 2024/0202267 A1 Jun. 20, 2024

(30) Foreign Application Priority Data
Dec. 16, 2022 (JP) .................. 2022-201459

(51) Int. Cl.
G06F 15/16 (2006.01)
G06F 16/954 (2019.01)
G06F 16/955 (2019.01)

(52) U.S. Cl.
CPC ........ G06F 16/9554 (2019.01); G06F 16/954 (2019.01)

(58) Field of Classification Search
CPC ........................... G06F 16/9554; G06F 16/954
USPC ......................................................... 709/217
See application file for complete search history.

(56) References Cited

U.S. PATENT DOCUMENTS

| | | | |
|---|---|---|---|
| 10,964,064 B1 * | 3/2021 | Watling .............. | G06F 16/5838 |
| 2004/0034576 A1 * | 2/2004 | Jones .................... | G06Q 30/02 |
| | | | 705/26.1 |
| 2005/0033662 A1 * | 2/2005 | Buch .................. | G06Q 30/0643 |
| | | | 705/27.2 |
| 2010/0262551 A1 * | 10/2010 | Caruso ............... | G06Q 30/0282 |
| | | | 705/347 |
| 2014/0099608 A1 * | 4/2014 | Crompton .............. | G06Q 90/00 |
| | | | 434/98 |

FOREIGN PATENT DOCUMENTS

| | | |
|---|---|---|
| JP | 2004-086348 A | 3/2004 |
| JP | 2010-170064 A | 8/2010 |
| JP | 3172271 U | 12/2011 |
| JP | 2012-065192 A | 3/2012 |
| JP | 2013-246160 A | 12/2013 |
| JP | 5941041 B2 | 6/2016 |
| JP | 6006177 B2 | 10/2016 |
| JP | 6470379 B1 | 2/2019 |
| JP | 2021-010085 A | 1/2021 |

OTHER PUBLICATIONS

Japan Patent Office, "Office Action for Japanese Patent Application No. 2022-201459," Feb. 14, 2023.

* cited by examiner

*Primary Examiner* — Alan S Chou
(74) *Attorney, Agent, or Firm* — HAUPTMAN HAM, LLP

(57) ABSTRACT

A server transmits data for displaying a website including a color chart, to a terminal that captures an image of a symbol in which a URL is encrypted displayed on a color sample book provided with a plurality of cards for displaying color samples, wherein on the color chart, positions of colors more than all listed colors in the color sample book are defined, all the listed colors are visually listed, and colors other than all the listed colors are not displayed or are masked and displayed.

8 Claims, 3 Drawing Sheets

SERVER, SYSTEM, AND DISPLAY DATA TRANSMISSION METHOD

RELATED APPLICATIONS

The present application is based on, and claims priority from, Japanese Application No. JP2022-201459 filed Dec. 16, 2022, the disclosure of which is hereby incorporated by reference herein in its entirety.

FIELD

Embodiments described herein relate generally to a technique for a system that includes a color sample book, and a server.

BACKGROUND

Conventionally, there is a color sample book that includes a plurality of cards displaying color samples and is used for selecting a color. In this color sample book, QR codes are displayed on the respective cards. By capturing the QR code by a terminal, information on a color compatible with a color sample displayed on the card is displayed on the terminal.

Incidentally, with the color sample book, it is difficult to grasp where the color sample is positioned on a color chart. According to this problem, even when colors having similar coloration to each other are listed on the same card, it cannot be grasped where each color is positioned on the color chart. Consequently, a problem occurs that it cannot be grasped how many intermediate colors are between each color or the coloration of intermediate colors.

DETAILED DESCRIPTION

A server in an embodiment transmits data for displaying a website including a color chart, to a terminal that captures an image of a symbol in which a URL is encrypted displayed on a color sample book provided with a plurality of cards for displaying color samples, wherein on the color chart, positions of colors more than all listed colors in the color sample book are defined, all the listed colors are visually listed, and colors other than all the listed colors are not displayed or are masked and displayed.

A display data transmission method in an embodiment transmits data for displaying a website including a color chart, to a terminal that captures an image of a symbol in which a URL is encrypted displayed on a color sample book provided with a plurality of cards for displaying color samples, wherein on the color chart, positions of colors more than all listed colors in the color sample book are defined, all the listed colors are visually listed, and colors other than all the listed colors are not displayed or are masked and displayed.

Hereinafter, embodiments are described with reference to the drawings.

Figure 1:
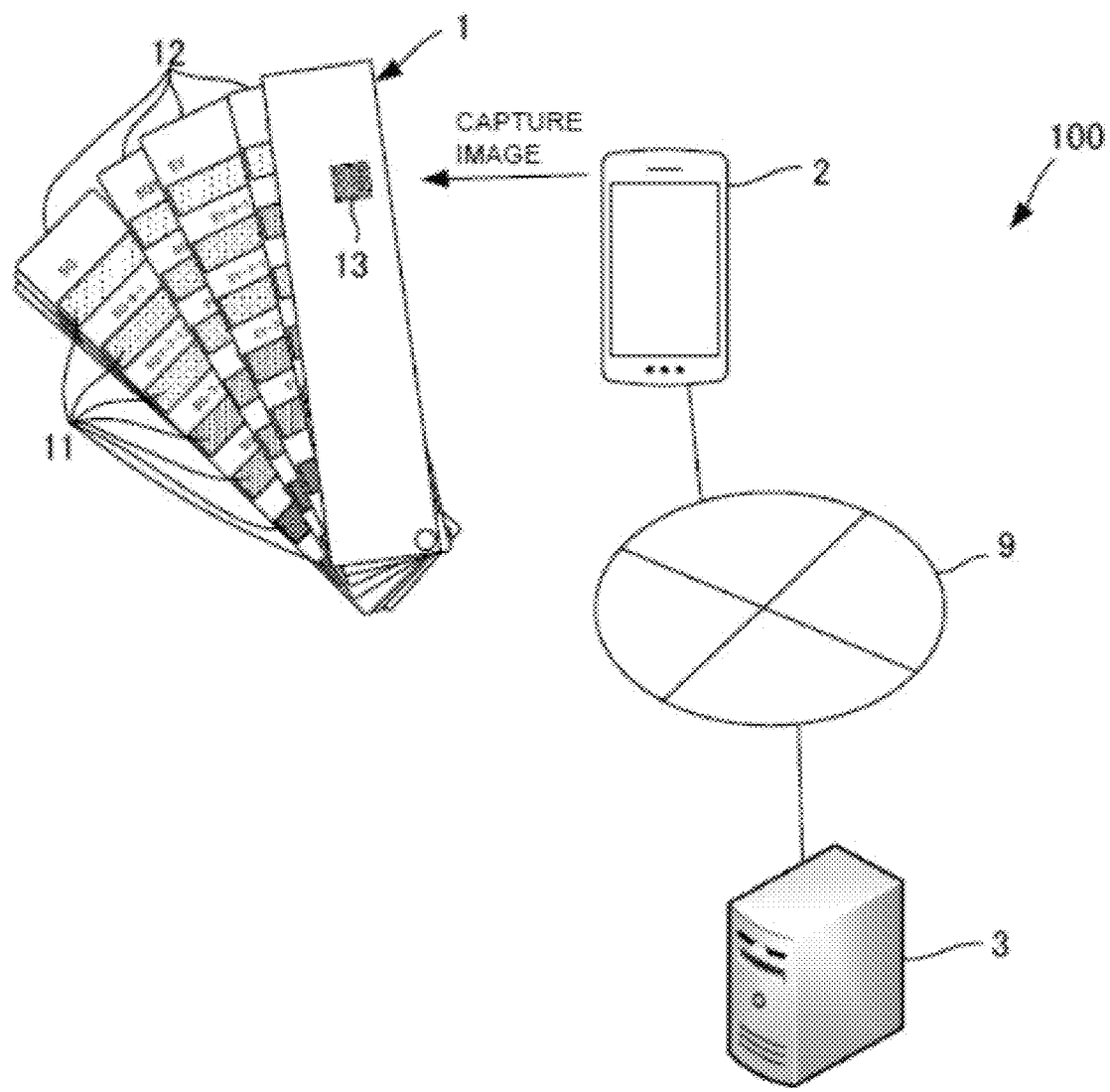
FIG. 1 shows the configuration of a system that uses a color sample book.

FIG. 1 shows the configuration of a system 100 that uses a color sample book 1.

The system 100 includes the color sample book 1, a terminal 2, and a server 3.

The color sample book 1 includes a plurality of cards 12 that display color samples 11, and displays a symbol 13. The shape of each card 12 may have a longitudinally elongated strip shape, or any appropriate shape. The plurality of cards 12 may be coupled in any appropriate manner, and for example, are coupled by a coupling member inserted through a hole at lower right of each card 12, rotatably in the circumferential direction centered on the coupling member.

On each card 12, one or more color samples 11 are displayed. For example, on a surface of each strip-shaped card 12, the plurality of color samples 11 are vertically displayed at intervals. For example, the color samples 11 may have a landscape rectangular shape over the width of each card 12. On one card 12, a plurality of color samples 11 having the same attribute, for example, the same hue, may be displayed. On one card 12, the same attribute to which a plurality of color samples 11 on the card 12 belong, for example, hues, such as 5Y, 5GY, 5G, etc. may be displayed. The display position of the same attribute, for example, the hue, to which the plurality of color samples 11 belong may be appropriately defined, and may be above the uppermost color sample 11. In a gap between a color sample 11 and a color sample 11 immediately therebelow, there may be displayed information related to the upper color sample 11, for example, color coordinates.

On one card 12, color samples 11 may be displayed in an order from the upper color to the lower color on a certain column of a color chart 41 (FIG. 2) that defines the positions of the colors along two orthogonal axes. By displaying about seven color samples 11 on one card 12, colors belonging to three or four different saturations (roughly classified tones) can be displayed. The color chart 41 displays, for example, 1,200 colors, among which e.g., 330 colors may be listed in the color sample book 1.

On one card 12, color samples 11 belonging to the same hue may be displayed in a descending or an ascending order of brightness (or blackness or lightness). On one card 12, color samples 11 belonging to the same hue may be displayed in a descending or an ascending order of colorfulness (or saturation). On one card 12, colors with different hues that have the same brightness or colorfulness may be displayed. On one card 12, appropriate colors in an appropriate color chart 41 may be displayed in an appropriate order.

The color sample book 1 can systematically list a large number of color samples 11, and assign color coordinates to the colors. Accordingly, this book can be used by an architect of buildings when making a coloring plan, be used by an architect specifying, for a builder, colors with which buildings and materials are painted, and be used to share the imagery of colors between remote sites.

The symbol 13 can be displayed at an appropriate position, such as a front page, in the color sample book 1. The symbol 13 includes encrypted data including a URL (Uniform Resource Locator), and may be a two-dimensional code or a one-dimensional code, for example, a QR code.

The server 3 is a computer, which includes a memory and a processor, and can communicate with an input device, such as a mouse which accepts a user input, and a display. The server 3 is connected to the Internet 9, discloses, to the Internet 9, a website that includes an after-mentioned web page 4 (FIG. 2) indicated by the URL included in the symbol 13, and transmits, to the terminal 2, data for displaying the website and the web page 4.

The terminal 2 is a computer equipped with a camera, which includes a memory, a processor, an input device, such as a touch panel which accepts a user input, and a display, and is equipped with a browser for browsing the website and the web page 4. The terminal 2 captures the symbol 13 on the color sample book 1, and obtains the URL included in data acquired by decoding the symbol 13 from the captured image. Upon acceptance of an instruction of accessing the URL from the user, the terminal 2 communicates with the server 3 indicated by the URL, via the Internet 9, obtains, from the server 3, data for displaying the website and the web page 4 indicated by the URL, and displays the website and the web page 4.

Figure 2:
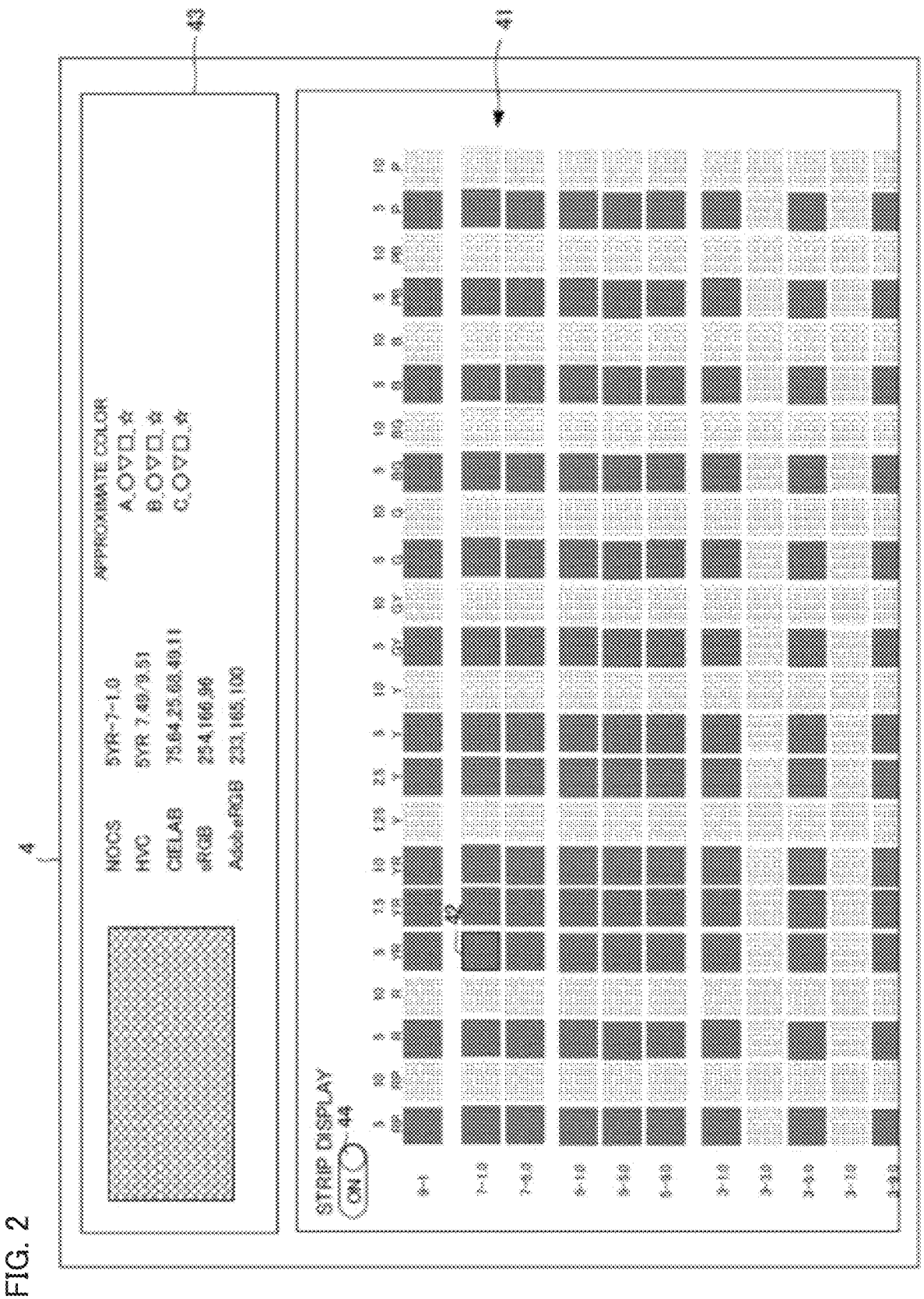
FIG. 2 shows an example of a web page displayed on a terminal.

FIG. 2 shows an example of the web page 4 displayed on the terminal 2.

The web page 4 displays, as content, the color chart 41 on which the positions of colors more than all the listed colors (colors of color samples 11) in the color sample book 1 are defined. In this embodiment, colors defined by the NOCS (Nakagawa Original Color System) are arranged on the color chart 41. FIG. 2 shows the example in which the terminal 2 displays an upper side of the color chart 41. By moving the display area of the terminal 2 downward, a lower side of the color chart 41 is displayed.

In this embodiment, an example is described in which the web page 4 including the color chart 41 is displayed directly from the symbol 13 of the color sample book 1. Alternatively, a website may be constructed so as to include a web page indicated by the URL included in the symbol 13, a web page 4 of the color chart 41, and other web pages. The web page 4 of the color chart 41 may then be displayed by clicking a link in the web page indicated by the URL included in the symbol 13. Alternatively, the web page 4 of the color chart 41 may be displayed from the web page indicated by the URL included in the symbol 13, via another web page on the website. Note that the website indicates, for example, a group of web pages having a common domain "xxOΔ◊" in a case in which the URL of the web page indicated by the URL included in the symbol 13 is "http://www.xxOΔ◊/page1", and the URL of the web page 4 of the color chart 41 is "http://www.xxOΔ◊/page2", and the URL of the other web page on the website is "http://www.xxOΔ◊/page3".

On the color chart 41, the ordinate and abscissa axes are orthogonal to each other, the ordinate axis indicates the tone, and the abscissa axis indicates the hue, and colors (color chips) are arranged along the ordinate and abscissa axes. The arranged colors have coloration based on their own color coordinates. The colors arranged in the horizontal direction have different hues. Above a color group that is arranged vertically on one column and has the same hue, the value of the hue is displayed. The colors arranged in the vertical direction have different tones. The tone is a complex concept of the saturation (corresponding to the colorfulness) and the blackness (corresponding to the brightness), and represents the state of color. The tone may be defined by the saturation and the lightness. To the left of a color group that is arranged horizontally on one row and has the same tone, the value of the tone is displayed. The tone is displayed in an order of saturation-hyphen-blackness. For example, to the left of the tone group on the first row from the top in FIG. 2, 9-1 is indicated as the tone. This indication indicates that the tone group has a saturation of nine, and a blackness of one. The higher the value of the saturation is, the more vivid it is. The higher the value of the blackness is, the darker it is.

According to the NOCS, the tone of each color with each hue is systematically configured by an algorithm under the same theory, and is described in detail in Japanese Patent Nos. 5941041, 6006177, and 6470379, and Japanese Patent Laid-Open No. 2021-010085 by the present applicant. According to the NOCS, detailed hues and tones are systematically identified by the algorithm. For example, about 1,200 colors constituting the color chart 41 can be identified.

Each color of the color chart 41 is displayed as a non-fringed quadrangle. Alternatively, each color may be fringed. There is a gap between upper and lower, and left and right colors. The colors in the vertical direction are arranged in a descending order of saturation, and the colors with the same saturation are arranged in an ascending order of blackness. The colors may be arranged from the top in an ascending order of saturation. The color with the same saturation may be arranged in a descending order of blackness. A large gap may be inserted between colors with different saturations.

As described above, on the color chart 41, first, the colors may be roughly classified by saturation, and furthermore, the colors with the same saturation may be classified by blackness, thus hierarchically arranging the colors. Here, the colors with the same saturation can be roughly grasped as those with the same tone, and have a color effect of providing a common impression even with different hues. In consideration of color harmony that is a combination of harmonized colors, colors with the identical hue and saturation can be assumed as the same. The color effect and the color harmony are theorized.

The arrangement of a significantly large number of colors on the color chart 41 along the two axes as described above allows the user to overview the entire component colors, examine colors with hues and saturations, and theoretically arrange colors in consideration of the color effect and color harmony. In a case of intending to examine detailed colors, the colors can be examined with blackness in the color group with the same saturation. Since each color is assigned the saturation-blackness that is a reference value itself, the hue is added to this value and designation is made, thus allowing correct color designation.

In this embodiment, such a color chart 41 visually lists all the listed colors in the color sample book 1, and masks and displays the colors other than all the listed colors. In FIG. 2, a color with a hue of 5RP and a tone of 9-1 is a listed color in the color sample book 1. The immediate right color with a hue of 10RP and a tone of 9-1 is masked. An appropriate technique is applicable to the masking only if the technique can correct display of colors other than all the listed colors in the color sample book 1 so that all the listed colors in the color sample book 1 can be highlighted against the colors other than all the listed colors in the color sample book 1. The masking is, for example, opacification masking, and thinly displays the colors other than all the listed colors in the color sample book 1. On the color chart 41, no color other than all the listed colors in the color sample book 1 may be displayed, and the positions of the colors other than all the listed colors in the color sample book 1 may be blank.

Each color group of the color samples 11 with the same hue listed in the color sample book 1 may include at least one color group with each saturation (e.g., 9, 7, 5, 3, 2, 1) among color groups with the same hue on the color chart 41. For example, on the color chart 41, a color group with a hue of 5RP includes one color with a saturation of 9, two colors with a saturation of 7, three colors with a saturation of 5, seven colors with a saturation of 3 . . . . As shown in FIG. 2, the color group of color samples 11 with a hue of 5RP listed in the color sample book 1 is highlighted on the color chart 41, includes all the colors with saturations of 9, 7, and 5 on the color chart 41, and three colors (blackness of 1.0, 5.0, and 9.0) intermittently from the color with a low blackness among the seven colors with saturation of 3. Appropriate colors on the color chart 41 can be used as color samples 11 in the color sample book 1. However, it is preferable to use a wide range of colors with hues and tones on the color chart 41.

When a color on the color chart 41 is selected through the input device, a frame 42 may be added to the color, and information related to the selected color may be displayed in an area 43 above the color chart 41. As the related information, the color coordinates of the selected color may be displayed with respect to each of color systems, such as HVC, CIELAB, SRGB, and AdobeRGB, for example. As the related information, the selected color on the color chart 41 may be displayed in an enlarged manner, and color coordinates of approximate colors of the selected color may be displayed.

In the system 100 in this embodiment, the color chart 41 can be displayed on the terminal 2 by capturing the symbol 13 of the color sample book 1 through the terminal 2. On the color chart 41, the positions of colors more than all the listed colors (all the color samples 11) in the color sample book 1 are configured along the two axes of the hue and the tone, thus facilitating grasping at which position the color sample 11 is on the color chart 41.

With visual reference to the color chart 41, presence or absence of intermediate colors between color samples 11 can be grasped, and the coloration of the intermediate colors can be estimated. On the color chart 41, by masking the colors other than the listed colors in the color sample book 1, the coloration of the intermediate colors can be grasped. With visual reference to the color chart 41, the difference between the color displayed on the terminal 2 and the actual color of the color sample 11 can be verified. The number of listed color samples 11 in the color sample book 1 is limited due to limitation on cost and the like. In the system 100 in this embodiment, a large number of colors can be displayed on the color chart 41, which can complement the color sample book 1. Since the system 100 in this embodiment can display such a color chart 41 only by capturing the symbol 13 of the color sample book 1 through the terminal 2, this system is useful.

Note that on the color chart 41 in this embodiment, the hue and the tone are taken along the axis directions that are orthogonal to each other. Alternatively, the hue and the tone may be taken in intersecting axis directions forming an angle smaller or larger than 90 degrees, or the colors may be arranged with the hue being taken in the circumferential direction and the tone being taken in the radial direction. The color chart 41 may be what includes a large number of colors arranged according to a unique rule. A large number of colors may be arranged along orthogonal or intersecting two axes, arranged in a circular ring shape, or arranged according to another appropriate method. The shapes of colors arranged on the color chart 41 may be quadrangles or circles, or another appropriately selected shape. Preferably, the axis directions of the color chart 41 are respectively assigned attribute values (e.g., the hue, colorfulness, and brightness).

On the color chart 41, the colors may be arranged according to any of arrangement rules that are, for example, the PCCS (Practical Color Co-ordinate System), Munsell system (Munsell solid), the NCS (Natural Color System), Ostwald system, DIN (Deutsche Industre Norm) system, and CIE (Commission Internationale d'Eclairage) system. On the color chart 41, the colors may be arranged according to the arrangement rule of an already known color sample book, such as the PANTONE color sample book or the DIC color sample book, or arranged according to an arrangement rule appropriately defined by a certain person. The color chart 41 two-dimensionally displays colors (two axes), or may three-dimensionally display colors (three axes).

The web page 4 may include a toggle button 44. By turning on the toggle button 44, all the listed colors in the color sample book 1 may be highlighted on the color chart 41. In this case, on the color chart 41, the colors other than all the listed colors in the color sample book 1 are masked or are not displayed.

Figure 3:
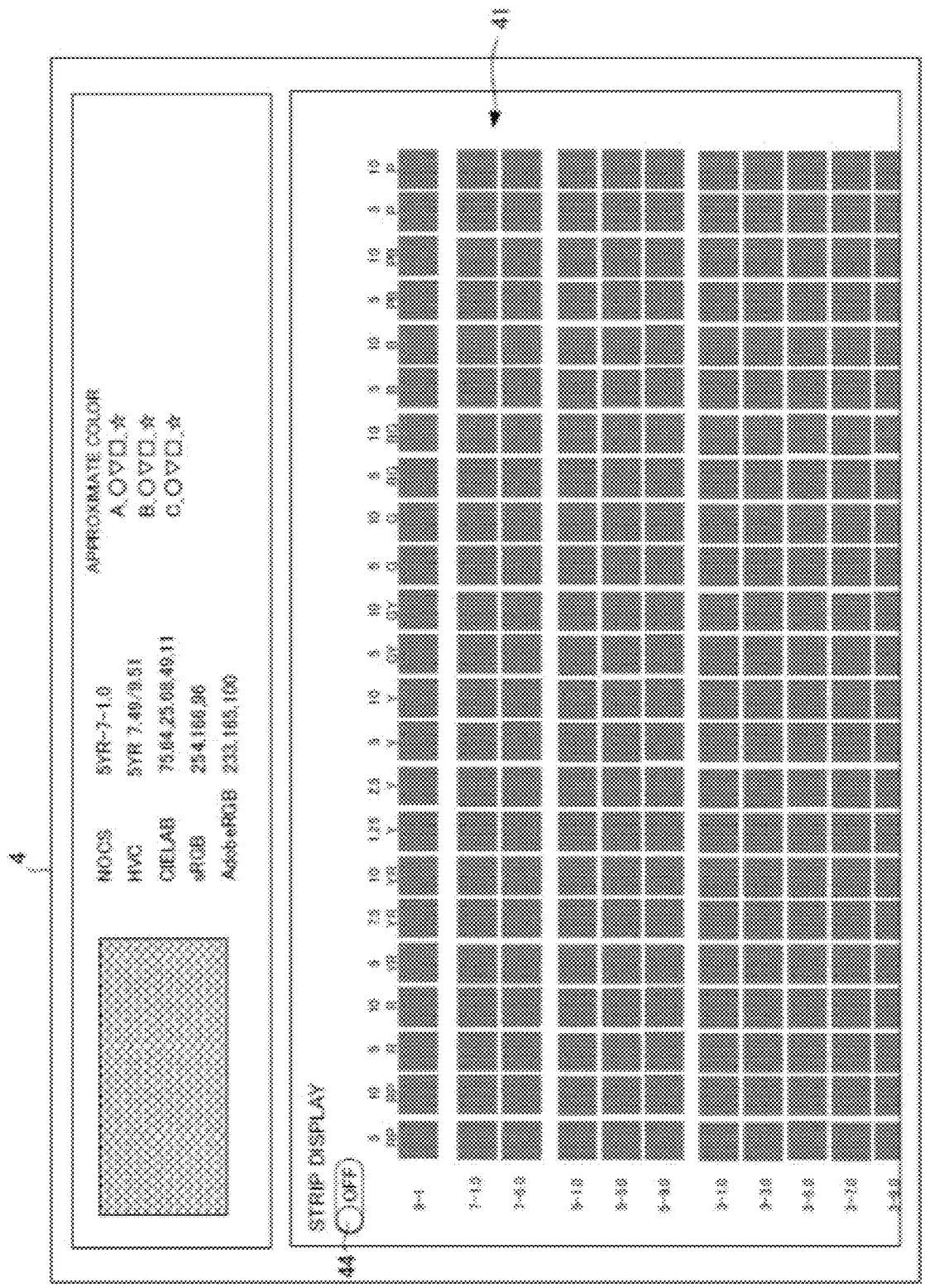
FIG. 3 shows a color chart in a case in which a toggle button is turned off.

FIG. 3 shows the color chart 41 in a case in which the toggle button 44 is turned off.

By turning off the toggle button 44, the colors other than all the listed colors in the color sample book 1 that are masked or are not displayed when the toggle button 44 is on are normally displayed as with the colors listed in the color sample book 1. Accordingly, the coloration of the colors other than all the listed colors in the color sample book 1 can be easily confirmed.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A server transmitting data for displaying a website including a color chart, to a terminal that captures an image of a symbol in which a URL is encrypted, wherein the symbol is displayed on a color sample book provided with a plurality of cards for displaying color samples, and the terminal displays the website on the data, and the website includes the color chart corresponding to the color sample book, and on the color chart, positions of colors more than all listed colors in the color sample book are defined, and all the listed colors are visually listed, and colors other than all the listed colors are masked and displayed.

2. The server according to claim 1,
wherein the server transmits data for displaying a web page including the color chart, to the terminal that captures the image of the symbol.

3. The server according to claim 1,
wherein on the website including the color chart, a first mode in which colors other than all the listed colors are not displayed or are masked and displayed, and a second mode in which the colors other than all the listed colors are not masked and are displayed are switchable by a user input.

4. The server according to claim 1,
wherein the color chart visually lists all the listed colors along two orthogonal axes.

5. The server according to claim 1, wherein the color chart comprises a first listed color listed in the color sample book, a second listed color listed in the color sample book, and a first color other than all listed colors, and the second listed color is arranged in a first direction with respect to the first listed color, and the first color is arranged between the first listed color and the second listed color in the first direction.

6. A system comprising:
the server according to claim 1; and
the color sample book displaying the symbol.

7. A display data transmission method transmitting data for displaying a website including a color chart, to a terminal that captures an image of a symbol in which a URL is encrypted,
 wherein the symbol is displayed on a color sample book provided with a plurality of cards for displaying color samples, and the terminal displays the website on the data, and the website includes the color chart corresponding to the color sample book, and on the color chart, positions of colors more than all listed colors in the color sample book are defined, and all the listed colors are visually listed, and colors other than all the listed colors are masked and displayed.

8. The method according to claim 7, wherein the color chart comprises a first listed color listed in the color sample book, a second listed color listed in the color sample book, and a first color other than all listed colors, and the second listed color is arranged in a first direction with respect to the first listed color, and the first color is arranged between the first listed color and the second listed color in the first direction.

* * * * *